(12) United States Patent
Lin

(10) Patent No.: US 10,858,200 B1
(45) Date of Patent: Dec. 8, 2020

(54) OBJECT ORIENTATION DEVICE, OBJECT ORIENTATION AND PRINTING SYSTEM AND METHOD FOR USE THEREOF

(71) Applicant: RONG CHANG METAL CO., LTD., Changhua County (TW)

(72) Inventor: Yu-Hung Lin, Changhua County (TW)

(73) Assignee: RONG CHANG METAL CO., LTD., Changhua County (TW)

( * ) Notice: Subject to any disclaimer, the term of this patent is extended or adjusted under 35 U.S.C. 154(b) by 0 days.

(21) Appl. No.: 16/821,105

(22) Filed: Mar. 17, 2020

(51) Int. Cl.
| | |
|---|---|
| *B65G 47/22* | (2006.01) |
| *B65G 47/24* | (2006.01) |
| *B65G 27/16* | (2006.01) |
| *B65G 47/244* | (2006.01) |
| *B65G 11/20* | (2006.01) |
| *B65G 11/02* | (2006.01) |

(52) U.S. Cl.
CPC .......... *B65G 47/244* (2013.01); *B65G 11/023* (2013.01); *B65G 11/203* (2013.01); *B65G 2203/0225* (2013.01)

(58) Field of Classification Search
CPC .... B65G 11/023; B65G 11/203; B65G 27/16; B65G 47/22; B65G 47/24; B65G 47/244
USPC ......... 198/382, 383, 752.1; 221/205; 101/37
See application file for complete search history.

(56) References Cited

U.S. PATENT DOCUMENTS

| | | | | |
|---|---|---|---|---|
| 5,314,056 A | * | 5/1994 | Davis ................. | B65G 47/1492 198/396 |
| 5,636,725 A | * | 6/1997 | Saito .................. | H05K 13/0417 198/396 |
| 6,283,272 B1 | * | 9/2001 | Hsieh ................. | B65G 47/1407 198/394 |
| 7,128,204 B2 | * | 10/2006 | Baranowski ......... | G01G 19/393 198/752.1 |

(Continued)

FOREIGN PATENT DOCUMENTS

| | | |
|---|---|---|
| CN | 205574921 U | 9/2016 |
| CN | 209955535 U | 1/2020 |
| JP | H1076398 A | 3/1998 |

OTHER PUBLICATIONS

US 2011/0067633 A1, Correa et al., Mar. 24 (Year: 2011).*

(Continued)

*Primary Examiner* — Douglas A Hess
(74) *Attorney, Agent, or Firm* — Tracy M Helms; Apex Juris, PLLC.

(57) ABSTRACT

An object orientation device includes a shaking stand and a slide provided on the shaking stand; the slide includes a sliding groove and a retaining member on the sliding groove. A retaining member is parallel to and extends along a sliding direction, and has a retaining surface parallel to a side wall of the sliding groove. The retaining surface and the side wall form an orientation space which is parallel to the sliding direction. After asymmetric objects are on the slide and shaken by the shaking stand, each object has a first end restricted into the orientation space, and has a seat orienta- (Continued)

tion and moves towards a predetermined direction. Such object orientation device allows objects to be aligned in the slide and have consistent seat orientations; a printing equipment can print on the same position of each object. Additionally, a system and a method of orientation and printing are provided.

15 Claims, 8 Drawing Sheets

(56) References Cited

U.S. PATENT DOCUMENTS

| | | | | |
|---|---|---|---|---|
| 7,472,787 | B2* | 1/2009 | Uusitalo | B65G 47/5145 198/395 |
| 7,810,632 | B2* | 10/2010 | Ohashi | B65G 27/34 198/720 |
| 7,980,381 | B2* | 7/2011 | Trejo | B65G 47/88 198/443 |
| 8,061,503 | B2* | 11/2011 | Ancarani | B65G 47/2445 198/398 |
| 8,109,381 | B2* | 2/2012 | Deyerl | B29C 49/4205 198/389 |
| 8,640,852 | B2* | 2/2014 | Seki | B07C 5/34 198/392 |
| 8,985,305 | B2* | 3/2015 | Wong | B65G 47/1421 198/383 |
| 10,160,603 | B2* | 12/2018 | Musil | B65G 27/04 |
| 10,239,698 | B1* | 3/2019 | Stemmerich | B65G 47/1421 |

OTHER PUBLICATIONS

US 2011/0316360 A1, Rhinehart, Dec. 29 (Year: 2011).*
Search report for TW109102263, dated Aug. 4, 2020, Total of 1 page.
English abstract for CN205574921, Total of 1 page.
English abstract for CN209955535, Total of 1 page.
English abstract for JPH1076398, Total of 1 page.

* cited by examiner provide an object orientation device which includes a shaking stand and a slide, wherein the slide is provided on the shaking stand; the slide includes a sliding groove and a retaining member which is provided on the sliding groove, wherein the long side of the retaining member is parallel to the sliding direction of the sliding groove, and the retaining member extends along the sliding direction; the retaining member has a retaining surface which is parallel to the side wall of the sliding groove; the retaining surface and the side wall form an orientation space, wherein the long side of the orientation space is parallel to the sliding direction of the sliding groove

↓ provide an object which is asymmetric, and make the object get into the slide

↓ shake the object by the shaking stand which makes the first end of the object to be restricted into the orientation space, so that the object has a seat orientation towards a predetermined direction fixedly, and moves towards the predetermined direction

↓ move the object to a printing device

↓ print on the object by the printing device

FIG.8

OBJECT ORIENTATION DEVICE, OBJECT ORIENTATION AND PRINTING SYSTEM AND METHOD FOR USE THEREOF

BACKGROUND OF THE INVENTION

1. Technical Field

The present invention relates generally to orientation and printing system, and more particularly to an object orientation device, an object orientation and printing system, and a method of object orientation and printing, which apply to spring washers.

2. Description of Related Art

Generally, hardware parts are small in size and large in quantity, so product information such as model numbers, material, specifications, and quantity can only be marked on packages. However, after a variety of hardware parts are taken out of the packages, various types of them are often mixed together in a storage bag, which brings difficulty in correctly distinguishing those hardware parts. Consequently, using hardware parts with wrong specifications may cause problems such as poor overall engineering quality.

In view of above, some manufacturers have printed model numbers on hardware parts to facilitate users to identify relevant information about the hardware parts. Due to the small size and large number of hardware parts, printing on hardware parts must be done by automated printing equipment. Additionally, if the position of the hardware parts to be printed on are specific, the hardware parts have to be arranged in a fixed direction. According to the prior art, the hardware parts are usually arranged in a fixed direction on a conveying device by manual labor.

However, arranging hardware parts on a conveying device by manual labor may make it difficult to align the hardware parts in the same direction due to operation error. Accordingly, product information may unable to be printed on specific positions of the hardware parts, or alternatively, incomplete printing may occur.

Besides, the operation error may cause operators' clothing or limbs to be rolled into the conveying device, which brings serious injury to the operators.

Form the above, there must be a new object orientation device, an object orientation and printing system, and a method of object orientation and printing, to solve the problems in traditional process of manufacturing hardware parts, BRIEF SUMMARY OF THE INVENTION In view of the above, the primary objective of the present invention is to provide an object orientation device which includes a retaining member of a slide, wherein the retaining member allows objects (e.g., spring washers) to be aligned in the slide and have consistent seat orientations, so that product information can be printed by a printing equipment on the same position of each object. The object orientation device of the present invention allows objects to be aligned automatically and have seat orientations towards the same direction, which improves the yield and efficiency of automatic printing on objects. Additionally, the object orientation device also avoids serious injury to operators caused by negligent operation.

The present invention provides an object orientation device includes a shaking stand and a slide. The slide is located on the shaking stand, wherein the slide includes a sliding groove and a retaining member which is on the retaining member. A long side of the retaining member is parallel to a sliding direction of the sliding groove, and the retaining member extends along the sliding direction. The retaining member has a retaining surface which is parallel to a side wall of the sliding groove; the retaining surface and the side wall form an orientation space; a long side of the orientation space is parallel to the sliding direction of the sliding groove. After a plurality of objects are put on the slide, the objects are shaken by the shaking stand, wherein each of the objects has no symmetric surfaces, which makes a first end of each object restricted into the orientation space, so that each object has a seat orientation towards a predetermined direction fixedly, and moves towards the predetermined direction.

Another objective of the present invention is to provide an object orientation and printing system, which includes the abovementioned object orientation device and a printing device. The printing device is connected to the object orientation device, wherein the printing device includes a printing unit. When the plurality of objects are moving from the object orientation device to the printing device, the seat orientation of each object is towards a printing direction. The printing unit prints product information in at least a specified position on the objects.

Another objective of the present invention is to provide a method of object orientation and printing, which includes the steps of:

providing an object orientation device which includes a shaking stand and a slide, wherein the slide is provided on the shaking stand; the slide includes a sliding groove and a retaining member which is provided on the sliding groove, wherein a long side of the retaining member is parallel to a sliding direction of the sliding groove, and the retaining member extends along the sliding direction; the retaining member has a retaining surface which is parallel to a side wall of the sliding groove, and the retaining surface and the side wall form an orientation space; a long side of the orientation space is parallel to the sliding direction of the sliding groove;

providing a plurality of objects, wherein each of the objects has no symmetric surfaces; making the plurality of objects get into the slide;

shaking the objects by the shaking stand, which makes a first end of each of objects be restricted into the orientation space, wherein each object has a seat orientation towards a predetermined direction fixedly, and moves towards the predetermined direction;

moving the plurality of objects to a printing device; and printing on the objects by the printing device.

The effects of the object orientation device of the present invention is that, the retaining member of the slide allows objects (e.g., spring washers) to be aligned in the slide and have consistent seat orientations, so that product information can be printed by the printing equipment on the same position of each object. The object orientation device allows objects to be aligned automatically and have seat orientations towards the same direction, which improves the yield and efficiency of automatic printing on objects. Additionally, the object orientation device also avoids serious injury to operators caused by negligent operation.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 8 is a flow chart of the method of object orientation and printing of the preferred embodiment of the present invention.

DETAILED DESCRIPTION OF THE INVENTION

Figure 1:
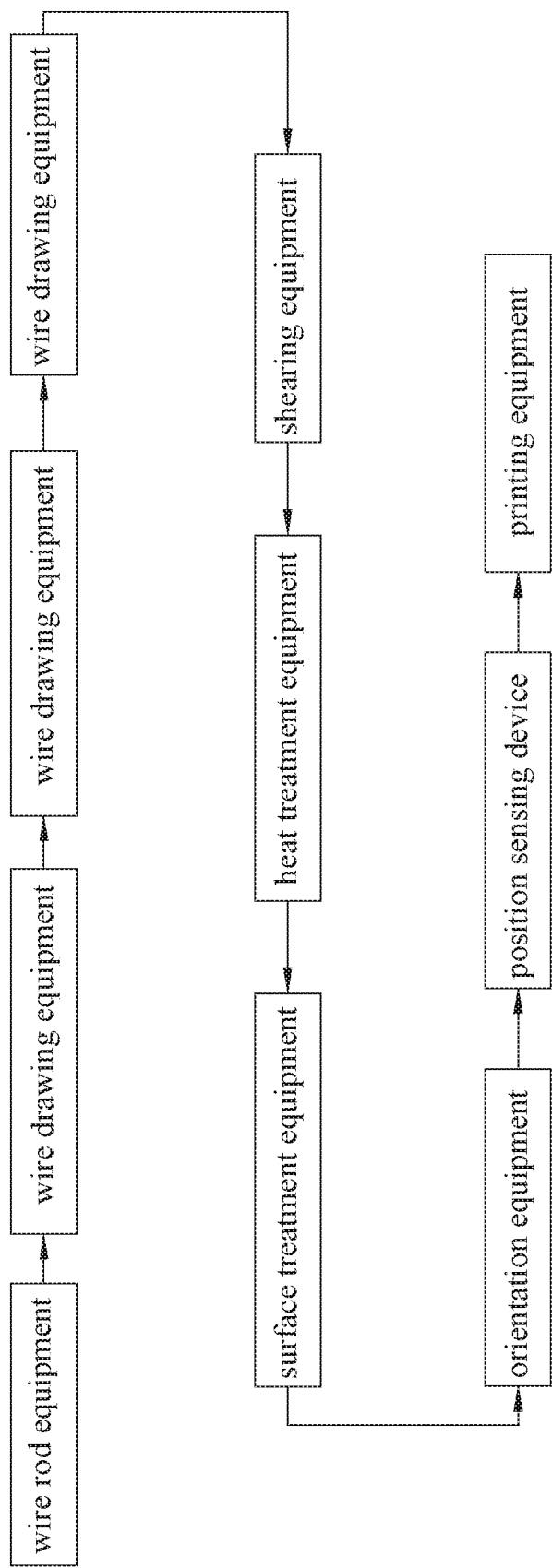
FIG. 1 is a block diagram of the object orientation and printing system of the preferred embodiment of the present invention.

FIG. 1 is a block diagram of an object orientation and printing system of the preferred embodiment of the present invention. Furthermore, the object orientation and printing system in this embodiment applies to spring washers, but this is not a limitation of the present invention. Practically, in other embodiments, the object orientation and printing system can apply to other types of hardware parts.

In FIG. 1, the object orientation and printing system includes an object orientation device 10 and a printing device 20. The object orientation device 10 is provided to make objects have seat orientations towards a predetermined direction fixedly, and move towards the predetermined direction. The printing device 20 is connected to the object orientation device 10, and includes a printing unit. When the objects are moving from the object orientation device 10 to the printing device 20, the seat orientations of the objects are towards a printing direction. Moreover, the printing unit prints product information in at least a specified position on each of the objects. In this preferred embodiment, the object orientation device 10 is also called an orientation equipment, while the printing device 20 is also called a printing equipment, as shown in FIG. 1. In this embodiment, the abovementioned objects have no symmetric surfaces, such as spring washers, but this is not a limitation of the present invention.

As shown in FIG. 1, the object orientation and printing system includes a position sensing device 30 which is provided between the object orientation device 10 and the printing device 20. An end of the position sensing device 30 is connected to the object orientation device 10, while the other end of the position sensing device 30 is connected to the printing device 20. The position sensing device 30 is provided to identify and move the objects so that the seat orientations of the objects are towards the abovementioned printing direction. In this embodiment, when the objects are moving in the position sensing device 30, the seat orientation of each object is finally towards the printing direction. In addition, in this embodiment, there are a wire rod equipment, a wire drawing equipment, a wire pressing equipment, a rolling equipment, a shearing equipment, a heat treatment equipment, and a surface treatment equipment in front of the object orientation and printing system in sequence, so as to form a spring washer manufacturing system.

Figure 2:
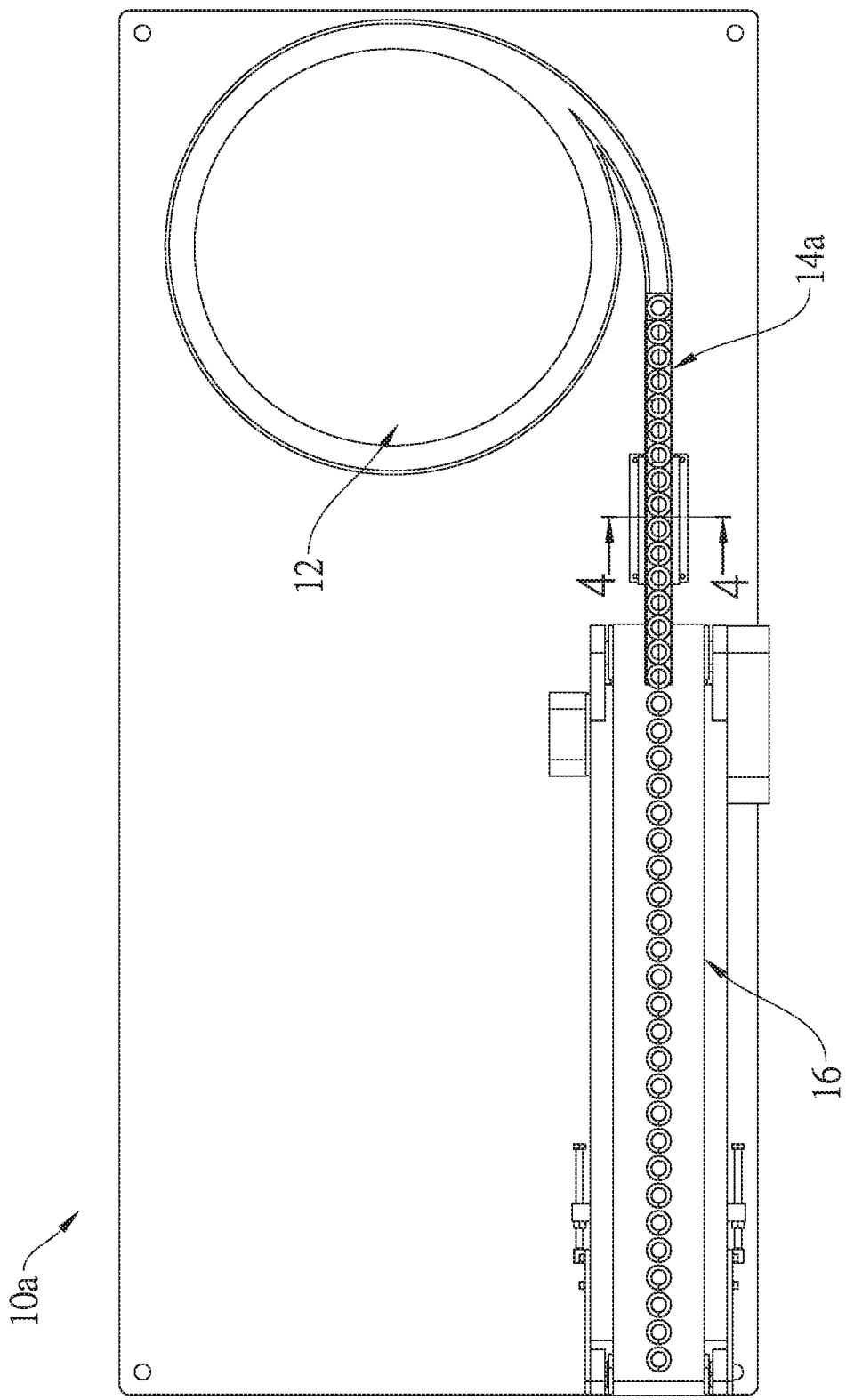
FIG. 2 is a top view of the object orientation device of the first preferred embodiment of the present invention.
Figure 3:
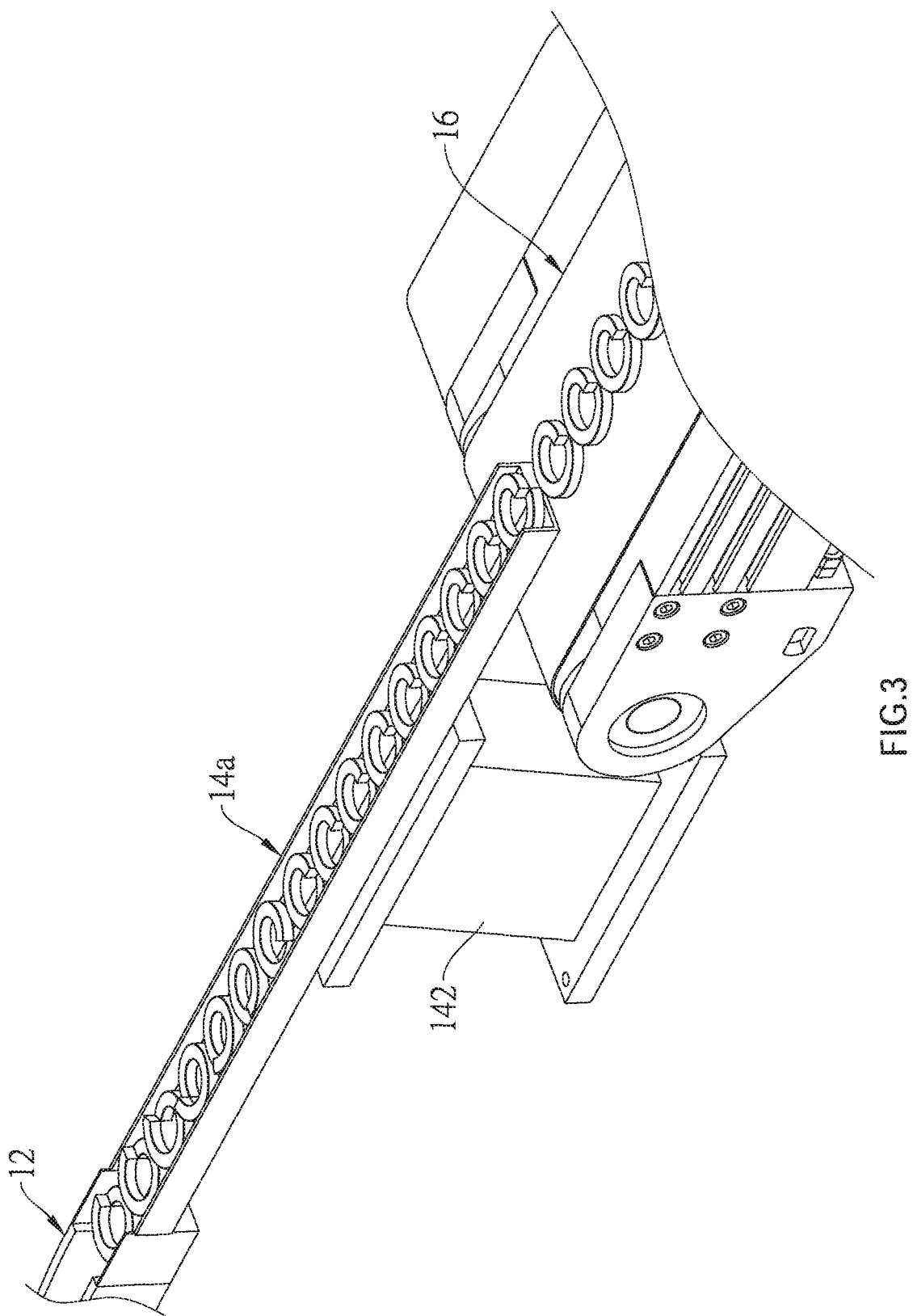
FIG. 3 is a partially perspective view of the object orientation device of the first preferred embodiment.
Figure 4:
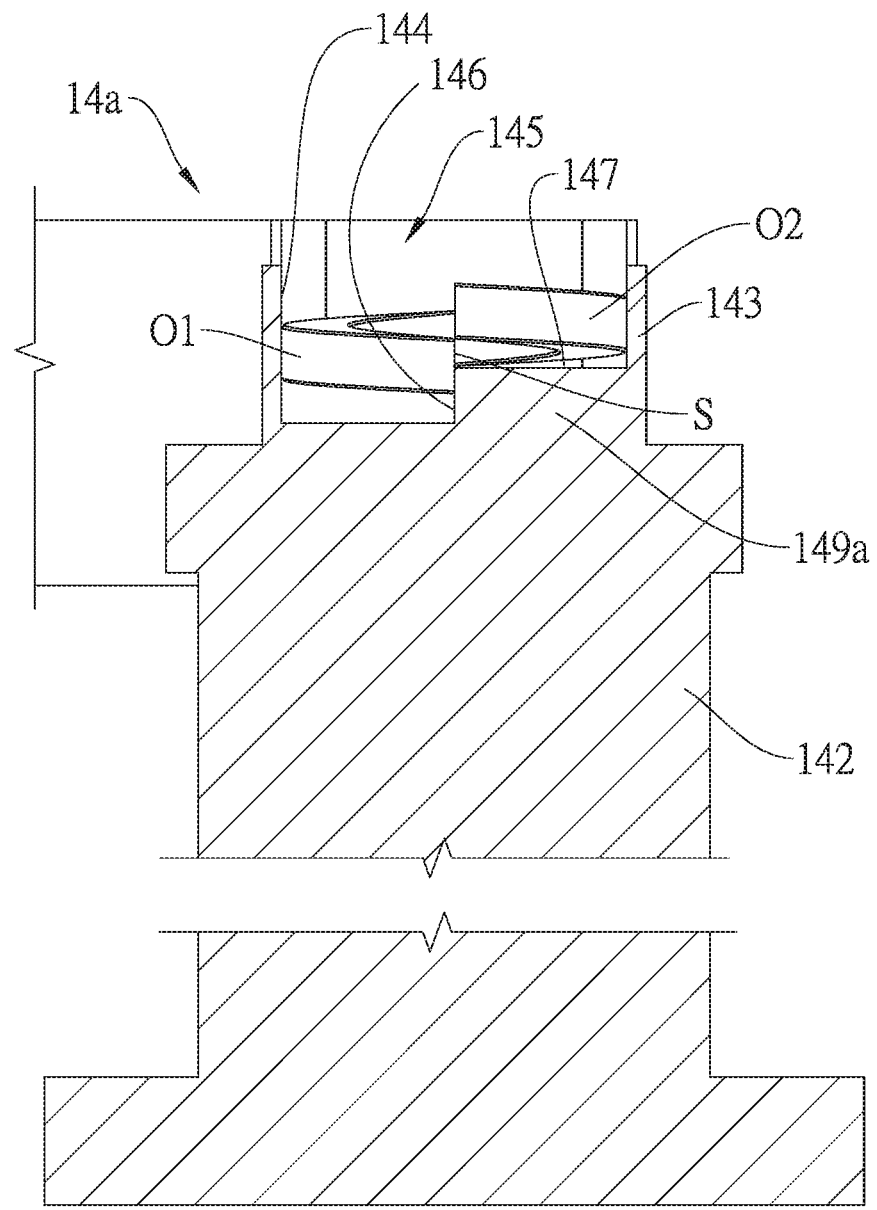
FIG. 4 is a sectional view along the 4-4 line in FIG. 2.

Referring to FIG. 1 to FIG. 4, FIG. 2 is a top view of an object orientation device 10a of a first preferred embodiment of the present invention; FIG. 3 is a partially perspective view of the object orientation device 10a of the first preferred embodiment; FIG. 4 is a sectional view along the 4-4 line in FIG. 2.

As shown in FIG. 1 to FIG. 3, a conveying device 16 is provided between the object orientation device 10a and the printing device 20; an end of the conveying device 16 is connected to the object orientation device 10a, while the other end of the conveying device 16 is connected to the printing device 20, so that objects can move from the object orientation device 10a to the printing device 20 through the conveying device 16. In the first embodiment, when the objects are moving in the conveying device 16, the seat orientation of each object is towards a predetermined direction.

As illustrated in FIG. 4, the object orientation device 10a includes a shaking stand 12, 142 and a slide 14a which is located on the shaking stand 142. The slide 14a includes a sliding groove 143 and a retaining member 149a, wherein the retaining member 149a is provided on the sliding groove 143. The long side of the retaining member is parallel to the sliding direction of the sliding groove, and the retaining member extends along the sliding direction.

Furthermore, the retaining member 149a has a retaining surface 146 which is parallel to the side wall 144 of the sliding groove 143; the retaining surface 146 and the side wall 144 form an orientation space 145. The long side of the orientation space 145 is parallel to the sliding direction of the sliding groove 143.

After the objects without symmetric surfaces are put on the slide 14a, the asymmetric objects would be shaken by the shaking stand 142, which makes a first end O1 of each object restricted into the orientation space 145, so that each object has the seat orientation towards the predetermined direction fixedly, and moves towards the predetermined direction.

In the first embodiment, the retaining member 149a is a block which is located in the sliding groove 143. The retaining surface 146 of the block and the side wall 144 of the sliding groove 143 forms the orientation space 145. In addition, the block has a top surface 147 which is higher than the retaining surface 146. In the first embodiment, the first end O1 of each object has a surface S touching the retaining surface 146 of the retaining member 149a.

When the object is put on the slide 14a, the first end O1 of the object is restricted into the orientation space 145, while a second end O2 that is different from the first end O1 is located on the top surface 147. In the first embodiment, the second end O2 is higher than the first end O1.

Figure 5:
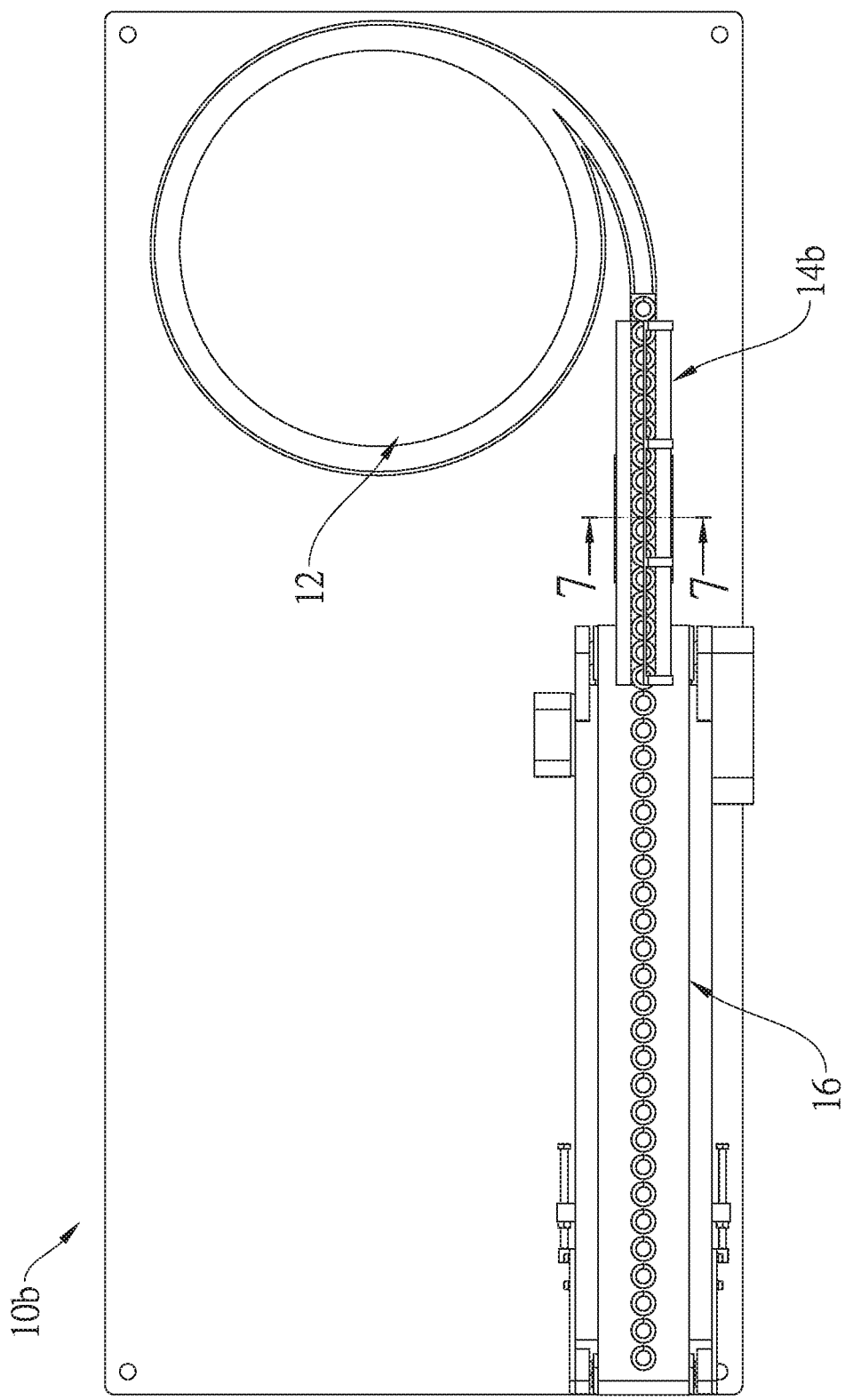
FIG. 5 is a top view of the object orientation device of the second preferred embodiment of the present invention.
Figure 6:
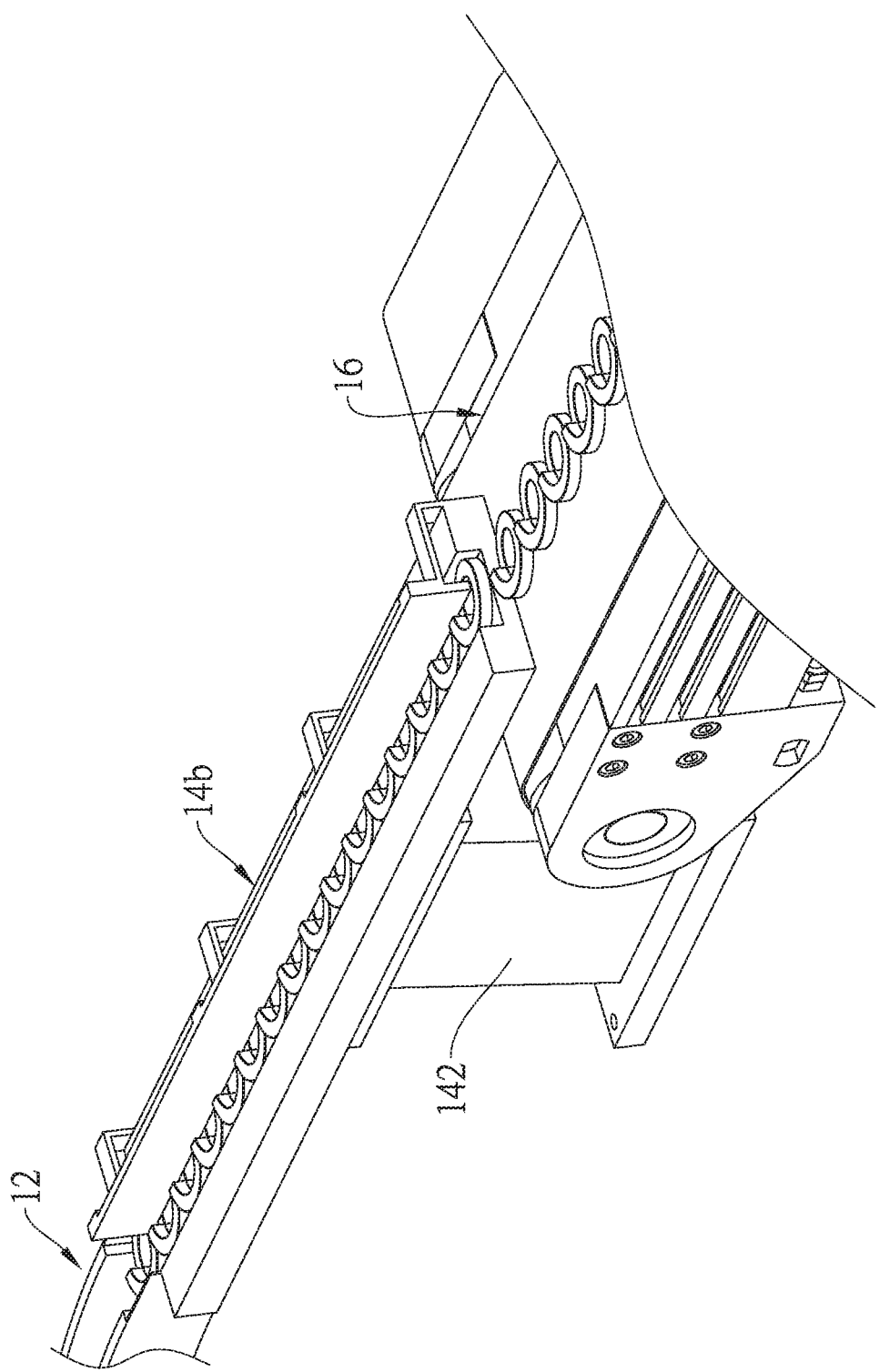
FIG. 6 is a partially perspective view of the object orientation device of the second preferred embodiment.
Figure 7:
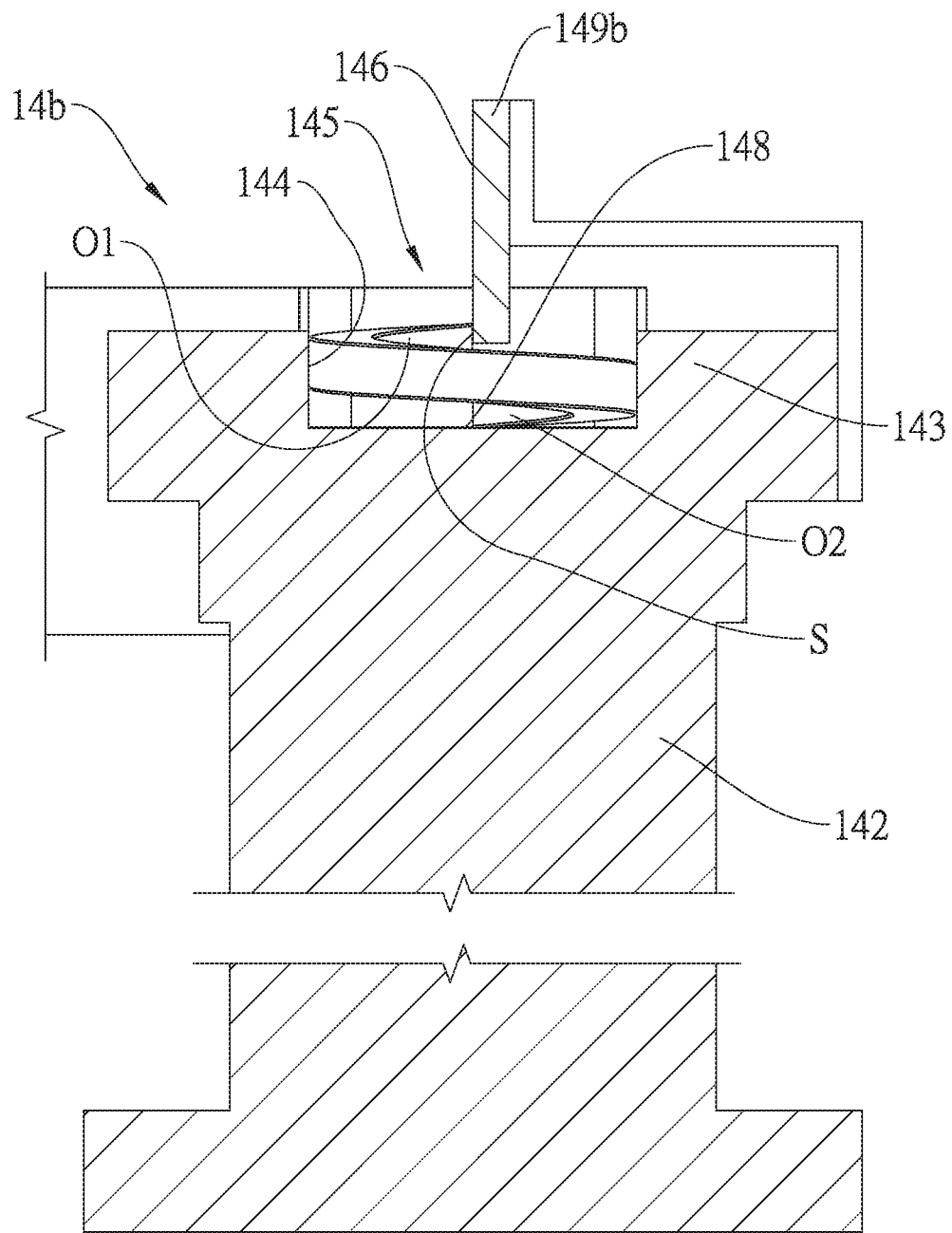
FIG. 7 is a sectional view along the 7-7 line in FIG. 5.

Referring to FIG. 1 and FIG. 5 to FIG. 7, FIG. 5 is a top view of the object orientation device 10b of a second preferred embodiment of the present invention; FIG. 6 is a partially perspective view of the object orientation device 10b; FIG. 7 is a sectional view along the 7-7 line in FIG. 5.

As shown in FIG. 5 to FIG. 7, the conveying device 16 is provided between the object orientation device 10b and the printing device 20. An end of the conveying device 16 is connected to the object orientation device 10b, while the other end of the conveying device 16 is connected to the printing device 20, so that the abovementioned objects can move from the object orientation device 10b to the printing device 20 through the conveying device 16. In the second embodiment, when the objects are moving in the conveying device 16, the seat orientation of each object is towards a predetermined direction.

As depicted in FIG. 7, the object orientation device 10b includes the shaking stand 12, 142 and the slide 14b. The slide 14b is provided on the shaking stand 142, and includes the sliding groove 143 and a retaining member 149b. The retaining member 149b is provided on the sliding groove 143. Moreover, the long side of the retaining member 149b is parallel to the sliding direction of the sliding groove 143, and the retaining member extends along the sliding direction.

The retaining member 149b has the retaining surface 146 which is parallel to the side wall 144 of the sliding groove 143; the retaining surface 146 and the side wall 144 form an orientation space 145. The long side of the orientation space 145 is parallel to the sliding direction of the sliding groove 143.

After the objects without symmetric surfaces are put on the slide 14b, the asymmetric objects would be shaken by the shaking stand 142, which makes the first end O1 of each object restricted into the orientation space 145, so that each object has the seat orientation towards the predetermined direction fixedly, and moves towards the predetermined direction.

In the second embodiment, the retaining member 149b is a baffle which is provided above the sliding groove 143. The retaining surface 146 of the baffle and the side wall 144 of the sliding groove 143 form the orientation space 145. When the objects are put on the slide 14b, the first end O1 of each object is restricted into the orientation space 145, while the second end O2 of each object, which is different from the first end O1, touches a bottom surface 148 of the sliding groove 143.

In the second embodiment, the first end O1 is higher than the second end O2. Additionally, the first end O1 of each object has the surface S touching the retaining surface 146 of the retaining member 149b, specifically, there is a distance between the baffle and the sliding groove 143, wherein such distance is longer than the thickness of each object but less than the total height of each object.

Referring to FIG. 8, FIG. 8 is a flow chart of the method of object orientation and printing of the preferred embodiment of the present invention. The method of object orientation and printing includes the steps as follows.

Step S01: provide the object orientation device 10a or 10b, which includes the shaking stand 12, 142 and the slide 14a or 14b, wherein the slide 14a or 14b is provided on the shaking stand 142. The slide 14a or 14b includes the sliding groove 143 and the retaining member 149a or 149b which is provided on the sliding groove 143, wherein the long side of the retaining member 149a or 149b is parallel to the sliding direction of the sliding groove 143, and the retaining member 149a or 149b extends along the sliding direction. The retaining member 149a or 149b has the retaining surface 146 which is parallel to the side wall 144 of the sliding groove 143; the retaining surface 146 and the side wall 144 form the orientation space 145, wherein the long side of the orientation space 145 is parallel to the sliding direction of the sliding groove 143.

Step S02: provide a plurality of objects which are asymmetric, that is, each of the objects has no symmetric surfaces; make the objects get into the slide 14a or 14b.

Step S03: shake the objects by the shaking stand 142 which makes the first end O1 of each object be restricted into the orientation space 145, so that each object has the seat orientation towards the predetermined direction fixedly, and moves towards the predetermined direction.

Step S04: move the objects to the printing device 20.

Step S05: print on the objects by the printing device 20.

In this embodiment, the method of the present invention includes the step of: moving the objects to the printing device 20 with the conveying device 16. The conveying device 16 is provided between the object orientation device 10a or 10b and the printing device 20; an end of the conveying device 16 is connected to the object orientation device 10a or 10b, while the other end of the conveying device 16 is connected to the printing device 20. Moreover, in this embodiment, when the objects are moving in the conveying device 16, the seat orientation of each object is towards the predetermined direction.

In the embodiment, the method includes the step of: identifying and moving the objects with the position sensing device 30 so that the seat orientations of the objects are towards the abovementioned printing direction. The position sensing device 30 is provided between the object orientation device 10a or 10b and the printing device 20. An end of the position sensing device 30 is connected to the object orientation device 10a or 10b, while the other end of the position sensing device 30 is connected to the printing device 20. In the embodiment, when the objects are moving in the position sensing device 30, the seat orientation of each object is finally towards the printing direction.

The present invention provides an object orientation device, an object orientation and printing system, as well as a method of object orientation and printing. The effect of this invention is that, the retaining member of the slide allows objects (e.g., spring washers) to be aligned in the slide and have consistent seat orientations, so that product information can be printed by the printing equipment on the same position of each object. Furthermore, the object orientation device of the present invention allows objects to be aligned automatically and have seat orientations towards the same direction, which improves the yield and efficiency of automatic printing on objects. Finally, the object orientation device also avoids serious injury to operators caused by negligent operation.

The embodiments described above are only preferred embodiments of the present invention. All equivalent structures and methods which employ the concepts disclosed in this specification and the appended claims should fall within the scope of the present invention.

What is claimed is:

1. An object orientation device comprising:
   a shaking stand; and
   a slide which is located on the shaking stand, wherein the slide comprises a sliding groove and a retaining member which is on the retaining member; a long side of the retaining member is parallel to a sliding direction of the sliding groove, and the retaining member extends along the sliding direction; the retaining member has a retaining surface which is parallel to a side wall of the sliding groove; the retaining surface and the side wall form an orientation space; a long side of the orientation space is parallel to the sliding direction of the sliding groove; after a plurality of objects are put on the slide, the plurality of objects are shaken by the shaking stand, wherein each of the plurality of objects has no symmetric surfaces, which makes a first end of each of the objects restricted into the orientation space, so that each of the objects has a seat orientation towards a predetermined direction fixedly, and moves towards the predetermined direction.

2. The object orientation device of claim 1, wherein the retaining member is a block which is located in the sliding groove; the retaining surface of the block and the side wall of the sliding groove form the orientation space; the block has a top surface which is higher than the retaining surface; when the plurality of objects are put on the slide, the first end of each of the objects is restricted into the orientation space, while a second end of each of the objects, which is different from the first end, is located on the top surface; the second end is higher than the first end.

3. The object orientation device of claim 1, wherein the retaining member is a baffle which is provided above the sliding groove; the retaining surface of the baffle and the side wall of the sliding groove form the orientation space; when the plurality of objects are put on the slide, the first end of each of the objects is restricted into the orientation space, while a second end of each of the objects, which is different from the first end, touches a bottom surface of the sliding groove; the first end is higher than the second end.

4. The object orientation device of claim 3, wherein there is a distance between the baffle and the sliding groove; the distance is longer than a thickness of each of the objects.

5. The object orientation device of claim 1, wherein the first end of each of the objects has a surface which touches the retaining surface of the retaining member.

6. An object orientation and printing system, comprising: the object orientation device of claim 1; and
a printing device which is connected to the object orientation device, wherein the printing device comprises a printing unit; when the plurality of objects are moving from the object orientation device to the printing device, the seat orientation of each of the objects is towards a printing direction; the printing unit prints product information in at least a specified position on the objects.

7. The object orientation and printing system of claim 6, further comprising a conveying device which is provided between the object orientation device and the printing device, wherein an end of the conveying device is connected to the object orientation device, while the other end of the conveying device is connected to the printing device, which allows the objects to move from the object orientation device to the printing device through the conveying device.

8. The object orientation and printing system of claim 6, wherein when the objects are moving in the conveying device, the seat orientation of each of the objects is towards the predetermined direction.

9. The object orientation and printing system of claim 6, further comprising a position sensing device which is provided between the object orientation device and the printing device, wherein an end of the position sensing device is connected to the object orientation device, while the other end of the position sensing device is connected to the printing device; the position sensing device is provided to identify and move the objects so that the seat orientations of the objects are towards the printing direction.

10. The object orientation and printing system of claim 6, wherein when the objects are moving in the position sensing device, the seat orientation of each object is finally towards the printing direction.

11. A method of object orientation and printing, comprising the steps of:

providing an object orientation device which comprises a shaking stand and a slide, wherein the slide is provided on the shaking stand; the slide comprises a sliding groove and a retaining member which is provided on the sliding groove, wherein a long side of the retaining member is parallel to a sliding direction of the sliding groove, and the retaining member extends along the sliding direction; the retaining member has a retaining surface which is parallel to a side wall of the sliding groove, and the retaining surface and the side wall form an orientation space; a long side of the orientation space is parallel to the sliding direction of the sliding groove;

providing a plurality of objects, wherein each of the plurality of objects has no symmetric surfaces; making the plurality of objects get into the slide;

shaking the plurality of objects by the shaking stand, which makes a first end of each of the plurality of objects be restricted into the orientation space, wherein each of the plurality of objects has a seat orientation towards a predetermined direction fixedly, and moves towards the predetermined direction;

moving the plurality of objects to a printing device; and printing on the plurality of objects by the printing device.

12. The method of claim 11, further comprising the step of:

moving the plurality of objects to the printing device with a conveying device; the conveying device is provided between the object orientation device and the printing device, wherein an end of the conveying device is connected to the object orientation device, while the other end of the conveying device is connected to the printing device.

13. The method of claim 12, wherein when the plurality of objects are moving in the conveying device, the seat orientation of each of the plurality of objects is towards the predetermined direction.

14. The method of claim 11, further comprising the step of:

identifying and moving the plurality of objects with a position sensing device so that the seat orientations of the plurality of objects are towards the printing direction; the position sensing device is provided between the object orientation device and the printing device, wherein an end of the position sensing device is connected to the object orientation device, while the other end of the position sensing device is connected to the printing device.

15. The method of claim 14, wherein when the plurality of objects are moving in the position sensing device, the seat orientation of each of the plurality of objects is finally towards the printing direction.

* * * * *